United States Patent
Kim et al.

(10) Patent No.: US 8,710,702 B2
(45) Date of Patent: Apr. 29, 2014

(54) REGENERATIVE POWER STORAGE SYSTEM MOUNTED ON DC ELECTRIC RAILWAY CAR

(75) Inventors: Gil-Dong Kim, Gyeonggi-do (KR); Han-Min Lee, Seoul (KR); Chang-Mu Lee, Gyeonggi-do (KR); Sung-Kyou Choi, Seoul (KR)

(73) Assignee: Korea Railroad Research Institute, Gyeonggi-do (KR)

( * ) Notice: Subject to any disclaimer, the term of this patent is extended or adjusted under 35 U.S.C. 154(b) by 289 days.

(21) Appl. No.: 13/257,547

(22) PCT Filed: Dec. 16, 2009

(86) PCT No.: PCT/KR2009/007523
§ 371 (c)(1),
(2), (4) Date: Sep. 19, 2011

(87) PCT Pub. No.: WO2011/030971
PCT Pub. Date: Mar. 17, 2011

(65) Prior Publication Data
US 2012/0013181 A1  Jan. 19, 2012

(30) Foreign Application Priority Data
Sep. 11, 2009  (KR) .................. 10-2009-0085748

(51) Int. Cl.
*H02M 3/06* (2006.01)
(52) U.S. Cl.
USPC .......................................... 307/109; 318/801
(58) Field of Classification Search
USPC .......................................... 307/109; 318/801
See application file for complete search history.

(56) References Cited

U.S. PATENT DOCUMENTS

| 4,841,427 | A  | * | 6/1989 | Miyazaki et al. | 363/62 |
| 5,412,378 | A  | * | 5/1995 | Clemens | 340/5.6 |
| 2003/0034831 | A1 | * | 2/2003 | Yoshizawa | 327/552 |
| 2003/0043605 | A1 | * | 3/2003 | Ishida et al. | 363/39 |
| 2006/0194702 | A1 | * | 8/2006 | Alberti et al. | 508/234 |
| 2006/0290318 | A1 | * | 12/2006 | Toda et al. | 318/801 |

FOREIGN PATENT DOCUMENTS

| JP | 2001-260719 A | 9/2001 |
| JP | 2004-056934 A | 2/2004 |
| JP | 2004-168214 A | 6/2004 |
| KR | 10-0659366 B1 | 12/2006 |
| KR | 10-2008-0093177 A | 10/2008 |

OTHER PUBLICATIONS

English Language Abstract of JP 2001-260719 A.
English Language Abstract of JP 2004-056934 A.
English Language Abstract of JP 2004-168214 A.

(Continued)

*Primary Examiner* — Stephen W Jackson
*Assistant Examiner* — Joseph Inge
(74) *Attorney, Agent, or Firm* — Rabin & Berdo, P.C.

(57) ABSTRACT

A regenerative electric power storage system installed onboard a DC electric rail car comprises: a filter unit which removes high frequency components from the DC power supplied through the catenary of a pantograph; a storage unit for storing power; a bidirectional DC/DC converter which is electrically connected between the filter unit and the storage unit; a DC/DC filter unit to remove high frequency noise; a voltage detection unit and a control unit which controls the switching of the bidirectional DC/DC converter. Instability is presented in the remaining systems of the electric rail car.

8 Claims, 4 Drawing Sheets

(56) References Cited

OTHER PUBLICATIONS

English Language Abstract of KR 10-2006-0073067 A which is the application publication of KR 10-0659366 B1.

English Language Abstract of KR 10-2008-0093177 A.
International Search Report of PCT/KR2009/007523 mailed on Sep. 16, 2010.

* cited by examiner

REGENERATIVE POWER STORAGE SYSTEM MOUNTED ON DC ELECTRIC RAILWAY CAR

TECHNICAL FIELD

The present invention relates generally to a regenerative power storage system mounted on a Direct Current (DC) electric railway car, and, more particularly, to a regenerative power storage system mounted on a DC electric railway car, which is mounted on an electric railway car, directly receives and stores regenerative power generated when regenerative braking is applied in order to brake the electric railway car, and directly supplies the regenerative power to the inverter of the electric railway car again if necessary.

BACKGROUND ART

Recently, as a method of braking an electric railway car which moves along a track line, a regenerative braking method, that is, a method of withdrawing electric energy from the kinetic energy of an electric railway car again when the accelerated electric railway car reduces speed in order to stop, has been used in order to save on energy.

Such a regenerative braking method has advantages in that problems, such as noise attributable to mechanical braking and the abrasion of a brake shoe, can be prevented as well as that the power consumption of the overall railway system can be reduced, so that the using range of the regenerative braking method is on an increasing trend.

However, with regard to such a regenerative braking method, when an accelerated railway car reduces its speed in order to stop using the regenerative braking method while in motion, an electric motor operates as a power generator and performs dynamic braking, so that a large amount of regenerative power is instantly generated. Such regenerative power instantly applies a large amount of voltage to a wiring, with the result that the voltage of the wiring varies, so that the system is unstable. Further, when an electric railway car which is going backwards cannot accommodate the voltage, the regenerative power only functions as a factor in the change in the voltage of the wiring, thereby causing trouble in the electric railway car which is going backwards.

Meanwhile, generally, a method of supplying voltage to an electric railway car is performed using a method of converting Alternating Current (AC) voltage into DC voltage using a rectifier and then supplying the DC voltage. The circuit of the rectifier is connected in a forward diode manner, so that the regenerative power of an electric railway car is not returned to power source side.

Therefore, surplus regenerative power which was not consumed on the wiring is converted into heat energy and then consumed, increases the voltage of the wiring and automatically blocked due to the over voltage of an entering electric railway car, or cannot be accommodated by the wiring, so that the regenerative power is consumed by a magnetic resistor, thereby causing regeneration-cancelled status.

In order to solve such a problem, an inverter for regeneration is installed in a DC rectifier so that the voltage of a wiring is converted into AC and then the resulting AC is returned to a power source side, or a separate storage device for receiving regenerative power from the wiring and storing the received regenerative power is installed. However, when regenerative power generated by a number of railway cars is returned to a power source side via an inverter without being filtered, the regenerative power including harmonics may unexpectedly damage receptors.

Further, Korean Patent Registration No. 0659366 entitled "Regenerative Power Storage System of Metro Railway", applied for by the present applicant and then registered, may be provided as an example which uses a separate storage device.

Korean Patent Registration No. 0659366 includes wiring configured to function as an electricity supply path for at least one electric railway car and, at the same time, function as a path used to return electricity generated by regenerative braking when the electric railway car reduces speed; a gate electrically connected to the wiring and capable of controlling the input/output of power; an energy storage device connected to the gate, configured to convert supplied electric energy into kinetic energy when power is supplied, configured to store the kinetic energy, configured to convert the stored kinetic energy back again into electric energy in response to a control signal, and configured to output the resulting electric energy; a voltage detection unit electrically connected to the wiring, and configured to detect the voltage of the wiring, a gate driving circuit configured to drive the gate in response to the control signal based on information detected by the voltage detection unit; and a microprocessor configured to determine the voltage detected by the voltage detection unit, configured to output the control signal to the gate driving circuit, and configured to control the operation of the energy storage device, thereby controlling the conversion between electric energy and kinetic energy and controlling the input/output of power.

However, the energy storage device is configured in mechanical manner using a fly-wheel. Accordingly, there are problems in that a lot of noise is produced during operation, the volume of the energy storage device itself is large, and a process of converting electric energy into kinetic energy is included, so that it is inefficient to receive and store instant electric energy.

Further, the system is configured to detect the electricity status of wiring while it is installed on the ground, so that there is a problem in that all the running electric railway cars may be affected when trouble occurs on the system and the system malfunctions or is out of control.

DISCLOSURE

Technical Problem

Accordingly, the present invention has been made keeping in mind the above problems occurring in the prior art, and an object of the present invention is to provide a regenerative power storage system mounted on a DC electric railway car, which is mounted on an electric railway car, converts regenerative power, generated when the brake is applied to the electric railway car, into DC voltage of the appropriate volume and stores the DC voltage as electric energy, and provides the stored electric energy back again to the electric railway car if necessary.

Another object of the present invention is to provide a regenerative power storage system mounted on a DC electric railway car, which has high storage efficiency, compared with an existing flywheel system and/or an energy storage system to be installed in a substation, thereby rapidly corresponding to instant regenerative voltage, rapidly charging and/or discharging the regenerative voltage, and being used semipermanently.

Technical Solution

In order to accomplish the above objects, the present invention provides a regenerative power storage system mounted on a Direct Current (DC) electric railway car, including a filter unit mounted on an electric railway car, and configured to remove high frequency components of DC power of a wiring, which is supplied through a pantograph; a storage unit configured to store the power which passed through the filter unit as electric energy; a bidirectional DC/DC converter electrically connected between the filter unit and the storage unit, and controlled such that the bidirectional DC/DC converter is open/closed in charging mode or electricity mode in response to a control signal; a DC/DC filter electrically connected between the bidirectional DC/DC converter and the storage unit, and configured to remove high frequency noise; a voltage detection unit configured to detect applied voltage of the filter unit; and a control unit configured to determine the applied voltage detected by the voltage detection unit, and configured to perform control such that the bidirectional DC/DC converter is open/closed.

Here, the filter unit includes an inductor and a capacitor, and a charging unit for preventing over current of the capacitor of the filter unit is further included.

Further, a current detection unit for detecting an amount of current which flows into the filter unit, and outputting the detected amount of current to the control unit is included, the charging unit further includes a cut-off switch for opening/closing electrical connection between the pantograph and the charging unit, and the control unit opens the cut-off switch when over current is detected by the current detection unit.

The charging unit includes impedance used for performing impedance matching on circuits; a cut-off switch configured to cut off power which flows into the charging unit; and a charging switch configured to turn on/off charging of the capacitor of the filter unit.

Meanwhile, the storage unit includes a capacitor; and a capacitor monitoring unit for measuring charging voltage of the capacitor of the storage unit, and outputting the measured charging voltage to the control unit is further included. The control unit turns off a first transistor when the storage unit is completely charged during operation in charging mode, and turns off a second transistor when the charging voltage is equal to or lower than reference voltage during operation in power supply mode.

Further, a first transistor and a second transistor are Insulated Gate Bipolar Transistors (IGBTs).

Further, the DC/DC filter includes an inductor for removing high frequency noise.

Further, the storage unit includes a super capacitor.

Further, the storage unit further includes a discharging switch for discharging charged power of a capacitor.

Advantageous Effects

According to the present invention, when the regenerative power, generated when regenerative braking is applied to an electric railway car, is converted into an appropriate volume of DC voltage and stored in the form of its own electric energy, and when power to be supplied to the electric railway car drops and becomes a value equal to or lower than reference voltage, stored electric energy is provided, so that there is an advantage in that regenerative energy which is instantly generated can be rapidly corresponded to, thereby preventing the various systems of the electric railway car from being unstable. In particular, there is an advantage in that the energy efficiency and stability of the entire metro railway system can be increased in a metro railway interval in which an operating section is short and variation in the voltage of a wiring is relatively large.

Further, compared with a storage device according to an existing mechanical fly-wheel method, the present invention rapidly corresponds to instant regenerative voltage, so that there is an advantage in that, when electric energy is stored and the electric energy is rapidly supplied back again via the wiring, power can be supplied while the properties of the energy itself remain unchanged.

Moreover, the present invention has advantages in that the weight or volume of the storage unit can be reduced using a capacitor, compared with a storage device using chemical battery or mechanical properties, and the storage unit can be installed using various capacities if necessary.

BEST MODE

Reference now should be made to the drawings, throughout which the same reference numerals are used to designate the same or similar components.

The features of a regenerative power storage system mounted on a DC electric railway car according to the present invention will be described in detail with reference to the attached drawings.

Figure 1:
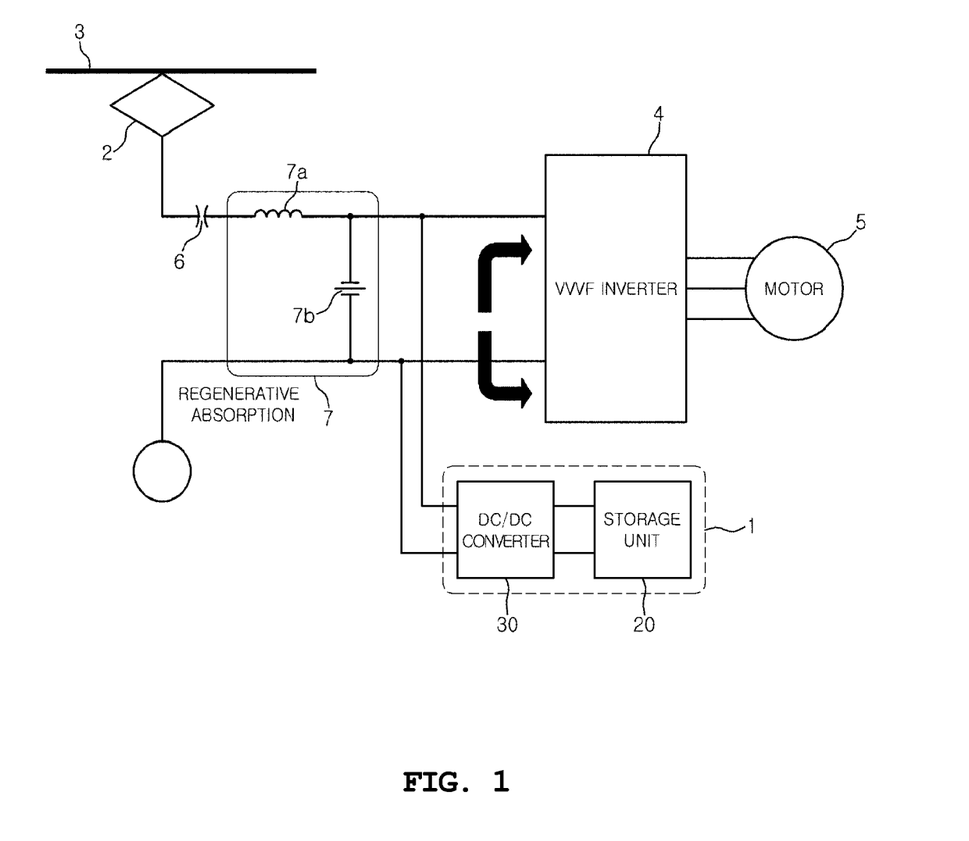
FIG. 1 is a diagram illustrating a regenerative power storage system mounted on a DC electric railway car according to the present invention.
Figure 2:
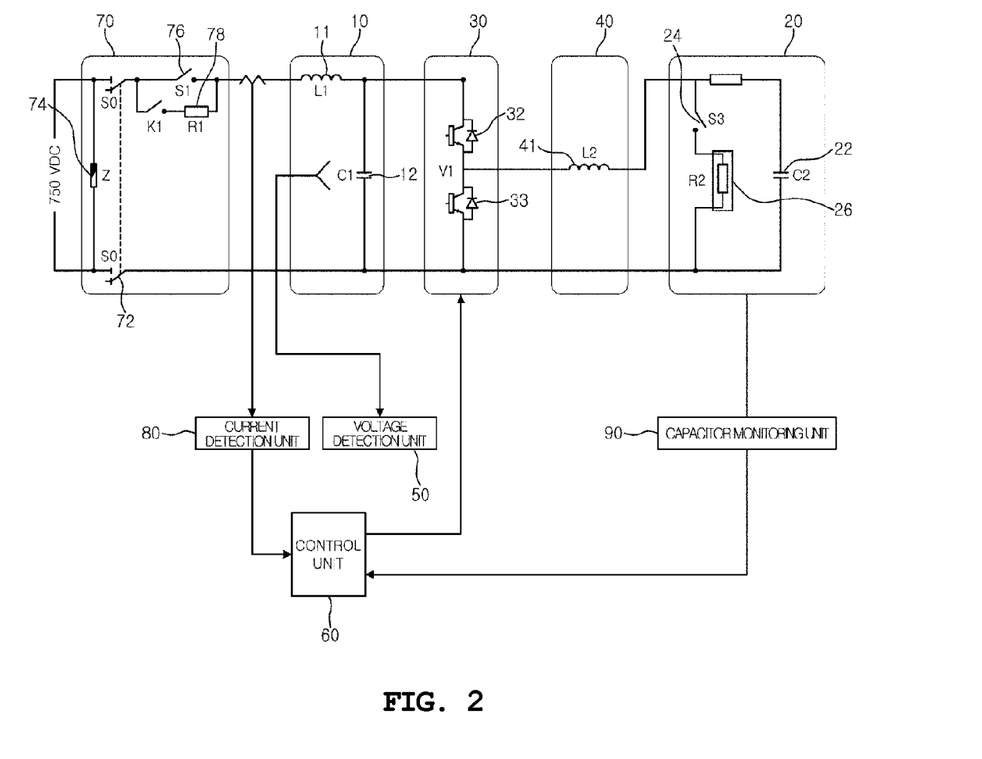
FIG. 2 is a diagram illustrating the regenerative power storage system mounted on a DC electric railway car according to the present invention in detailed.
Figure 3:
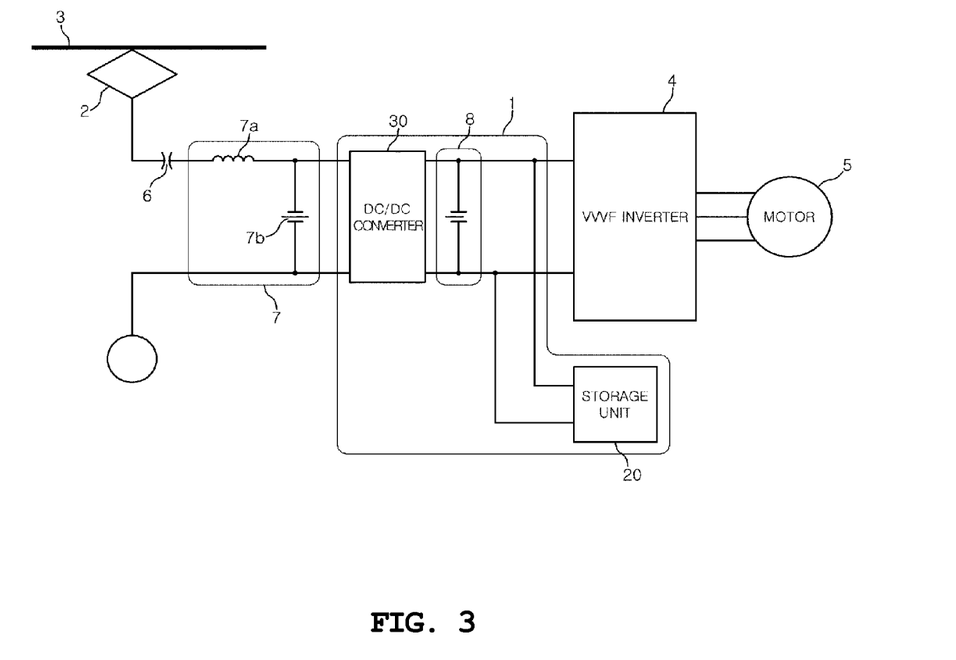
FIG. 3 is another diagram illustrating the regenerative power storage system mounted on a DC electric railway car according to the present invention.
Figure 4:
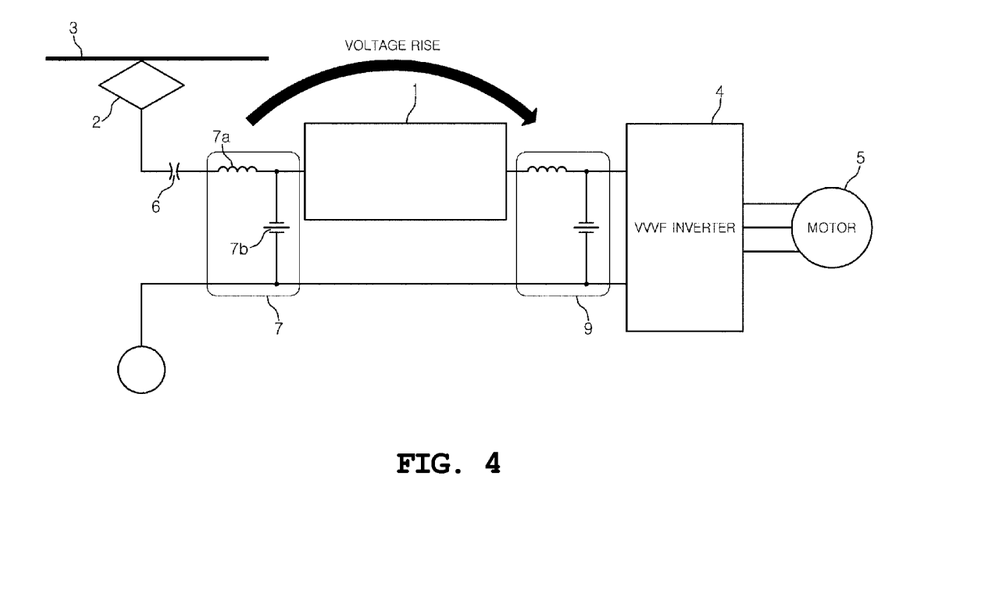
FIG. 4 is further another diagram illustrating the regenerative power storage system mounted on a DC electric railway car according to the present invention.
Figure 5:
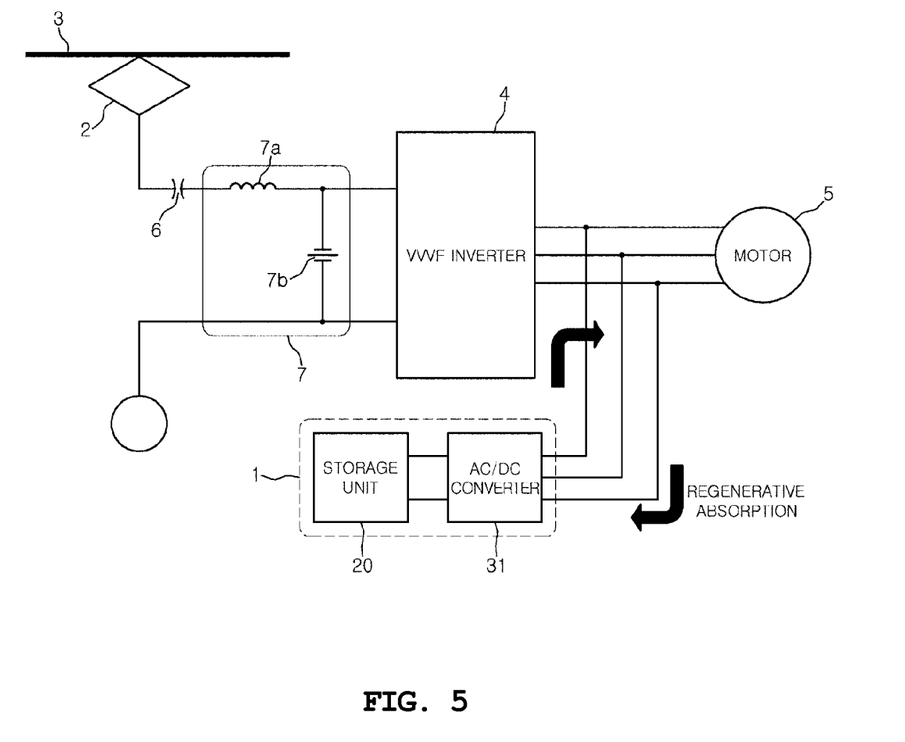
FIG. 5 is more another diagram illustrating the regenerative power storage system mounted on a DC electric railway car according to the present invention.

Here, FIG. 1 is a diagram illustrating a regenerative power storage system mounted on a DC electric railway car according to the present invention, FIG. 2 is a diagram illustrating the regenerative power storage system mounted on a DC electric railway car according to the present invention in detailed, FIG. 3 is another diagram illustrating the regenerative power storage system mounted on a DC electric railway car according to the present invention, FIG. 4 is further another diagram illustrating the regenerative power storage system mounted on a DC electric railway car according to the present invention, and FIG. 5 is more another diagram illustrating the regenerative power storage system mounted on a DC electric railway car according to the present invention.

Referring to FIG. 1, a regenerative power storage system 1 mounted on a DC electric railway car according to the present invention is mounted on an electric railway car, and enables stored electric energy to be used as subsidiary power for the electric railway car if necessary while storing electric energy generated when regenerative braking is applied to the electric railway car.

Here, the electric railway car receives the power of a wiring 3 through a pantograph 2. The power received through the pantograph 2 passes through a DC circuit breaker 6 and an inverter 4 for converting DC power into AC power in order to control the motor, and then is used to control the drive of the motor 5. Meanwhile, power is supplied through a well-known main filtering unit 7 which includes a filter reactor 7a configured to smooth DC riffle obtained from the wiring 3, and a filter capacitor 7b connected to the filter reactor 7a and used to stabilize the DC voltage.

Here, the regenerative power storage system, used to effectively process power generated when regenerative braking is applied, is provided between the pantograph 2 and the inverter 4.

Such a regenerative power storage system mounted on a DC electric railway car according to the present invention is mounted on an electric railway car, and includes: a filter unit 10 configured to remove the high frequency components of applied power supplied from the wiring 3 which is a path for supplying electricity through the pantograph 2; a storage unit 20 configured to include a capacitor which stores electric energy; a bidirectional DC/DC converter 30 electrically connected between the filter unit 10 and the storage unit 20, and controlled in such a way as to open or close a first transistor 32 and a second transistor 33 in response to a control signal; a DC/DC filter 40 electrically connected between the bidirectional DC/DC converter 30 and the storage unit 20 and configured to remove high frequency noise; a voltage detection unit 50 configured to detect the applied voltage of the filter unit 10; and a control unit 60 configured to determine the applied voltage detected by the voltage detection unit 50 and output an open/close control signal to each of the first and second transistor 32 and 33 of the bidirectional DC/DC converter 30.

Here, Insulated Gate Bipolar Transistors (IGBTs) are used as the first and second transistor 32 and 33.

Meanwhile, a charging unit 70 is electrically connected between the pantograph 2 and the filter unit 10, and configured to prevent over current when a capacitor 12, included in the filter unit 10, is charged.

Further, a current detection unit 80 for detecting the amount of current which flows into the filter unit 10 and outputting the amount of current to the control unit 60 is further included. The charging unit 70 further includes a cut-off switch 72 for opening/closing the electrical connection between the charging unit 70 and the pantograph 2.

With the above-described configuration, when over current is detected from the detection unit 80, the control unit 60 opens the cut-off switch 72.

Meanwhile, a capacitor monitoring unit 90 for measuring the voltage and power of the storage unit 20 and outputting the measured voltage and power to the control unit 60 is further included. The control unit 60 outputs a control signal used to perform control such that the first transistor 32 is turned off when the storage unit 20 is completely charged in charging mode, and outputs a control signal used to perform control such that the second transistor 33 is turned off when the voltage received from the capacitor monitoring unit 90 is equal to or lower than reference voltage in power supply mode. The configuration of each of units of the present invention will be described in more detail below.

First, the wiring 3 is a path used to supply electricity to an electric railway car, and power supplied from the wiring 3 passes through the bidirectional DC-DC converter 30 via the pantograph 2 of the electric railway car.

Here, since the bidirectional DC-DC converter 30 is a device for performing oscillation between basically several tens of KHz to several hundreds of KHz inside, and raising and/or dropping voltage, the bidirectional DC-DC converter 30 requires a filter in order to prevent high frequency noise, generated due to the switching operation of a switching element, such as a transistor or a Field Effect Transistor (FET), inside, from flowing out through an input terminal or an output terminal.

For this purpose, a filter unit 10 is provided between the pantograph 2 and the bidirectional DC-DC converter 30 in order to remove high frequency noise.

Although such filter unit 10 includes an inductor 11 connected in series and a capacitor 12 connected in parallel in order to remove high frequency noise, other equivalent circuits may be substituted for in order to remove high frequency noise.

Here, when the capacity of the capacitor 12 included in the filter unit 10 is small, there is no problem because time required until the capacitor 12 is charged is short. However, when the capacity of the capacitor 12 is large, there is a risk of over current because the capacitor is the same as in short circuited status until the capacitor 12 is charged in some degree and the amount of current is reduced.

Especially, the over current of the filter unit 10 may cause serious problems with peripheral systems, so that a protection circuit should be provided. The protection circuit is realized by providing the charging unit 70 between the pantograph 2 and the filter unit 10.

Such charging unit 70 includes impedance 74 for performing impedance matching between circuits, the cut-off switch 72 for cutting off power to be supplied into the charging unit 70, and a charging switch 76 for turning on/off the charge of the capacitor 12 of the filter unit 10.

The charging unit 70, configured as described above, prevents the flow of over current using the resistor 78 of the charging unit 70 when the charging switch 76 is turned off, and allows the charging switch 76 to be turned on after the capacitor 12 of the filter unit 10 is sufficiently charged.

Meanwhile, the impedance 74 is used to perform impedance matching between circuits, and can be selectively applied if necessary. The cut-off switch 72 is provided to independently cut off power.

Meanwhile, the bidirectional DC/DC converter 30 includes the first and second transistor 32 and 33, which are turned on or turned off under the control of Pulse Width Modulation (PWM), and bidirectionally converts DC voltage into specific DC voltage while the first and second transistor 32 or 33 is switched on or off.

Here, the control signal used for the first and second transistor 32 or 33 is applied from the control unit 60. When switching is performed such that the second transistor 33 is turned off and the first transistor 32 is turned on in response to the control signal of the control unit 60, the bidirectional DC/DC converter 30 operates as a buck converter. Meanwhile, when switching is performed such that the first transistor 32 is turned off and the second transistor 33 is turned on, the bidirectional DC/DC converter 30 operates as a boost converter. However, in order to control bidirectional power flow, it is preferable that the first transistor and the second transistor 33 are controlled while the phase difference therebetween is 180°. In this case, the second transistor 33 performs a main switching function.

Further, like the filter unit 10, the DC/DC filter 40, provided between the bidirectional DC/DC converter 30 and the storage unit 20, includes an inductor 41 in order to prevent various problems from occurring when high frequency noise flows into peripheral devices. Another equivalent circuit may be substituted for the inductor 41, and this is disclosed in the same technical scope.

Next, the storage unit 20 includes a super capacitor 22, and stores regenerative power received through the bidirectional DC/DC converter 30. Here, storage time is determined depending on the capacity of the super capacitor 22. Meanwhile, the storage unit 20 includes a discharging switch 24 for artificially discharging charged power from the super capacitor 22, and includes a resistor 26.

Further, the current detection unit 80 measures current, which flows into the filter unit 10, and outputs the measured current to the control unit 60. The voltage detection unit 50 detects voltage at both ends of the capacitor 12 of the filter unit 10 and outputs the detected voltage to the control unit 60. The capacitor monitoring unit 90 measures the voltage and the amount of charged current of the capacitor 22 of the storage unit 20, and outputs the measured voltage and the amount of charged current to the control unit 60.

Further, the control unit 60 may be formed of a microprocessor or a general computer system. Generally, reference voltage to be supplied to an electric railway car is chiefly DC 750V or 1500V in the metro railway, the subway, and the light rail in Korea. Reference voltage used to store regenerative power is set to a value which is larger than that of applied voltage, and reference voltage used to supply regenerative power again is set to a value which is smaller than that of the applied voltage.

For example, it is assumed that setting is made such that applied voltage is DC 750V, regenerative power storage reference voltage is DC 1000V which is larger than the applied voltage, and regenerative power supply reference voltage is DC 500V which is smaller than the applied voltage. When the applied voltage detected by the voltage detection unit 50 is equal to or larger than DC 1000V, the control unit 60 outputs a control signal used to perform switching such that the first transistor 32 of the bidirectional DC/DC converter 30 is turned on in order to be converted into charging mode, thereby operating the bidirectional DC/DC converter 30 as a buck converter.

Further, when the applied voltage drops down and is equal to or lower than 500V, the control unit 60 outputs a control signal used to perform switching such that the first transistor 32 of the bidirectional DC/DC converter 30 is turned off and the second transistor 33 is turned on, thereby operating the bidirectional DC/DC converter 30 as a boost converter.

In this case, the control unit 60 outputs a control signal used to control the first and second transistors 32 and 33 of the bidirectional DC/DC converter 30 in PWM manner. Since the control according to the PWM manner is a well-known method, the detailed description thereof will be omitted.

Meanwhile, when the capacitor monitoring unit 90 outputs notification that the capacitor 22 of the storage unit 20 is completely charged, the control unit 60 does not change into the charging mode even when the applied voltage is equal to or larger than 750V (the storage reference voltage). When the voltage of the storage unit 20 measured by the capacitor monitoring unit 90 is equal to or lower than 500V (the supply reference voltage), the control unit 60 does not change into the power supply mode.

An example of the operation of the regenerative power storage system mounted on a DC electric railway car according to the present invention will be described in detail below.

The railway car of a metro railway runs along a track line while repeatedly traveling and stopping between stations.

Here, the electric railway car accelerates in such a way as to receive the DC voltage of the wiring 3 through the pantograph 2 and drive an electric motor 5. After the electric railway car accelerated at regular speed, the electric railway car performs an inertia operation according to the law of inertia. When the electric railway car reduces speed, the electric motor functions as a power generator, and generates power using the inertia kinetic energy of the electric railway car, thereby generating regenerative power. In order to store the regenerative power or supply the stored regenerative power, the drive is realized in such a way that mode is divided into initial operation mode, general monitoring mode, charging mode, and power supply mode.

That is, the initial operation mode is mode used to charge the capacitor 12 of the filter unit 10. The charging unit 70 charges the capacitor 12 of the filter unit 10 while preventing over current which flows through the pantograph 2 based on the operation of the charging switch 76.

Here, the time that the charging switch 76 of the charging unit 70 is changed into a turned-on state is the time that about 70% of the capacitor 12 of the filter unit 10 has been charged. When the charging is completed, voltage is applied to the both ends of the capacitor 12 of the filter unit 10.

As described above, when voltage is applied, the voltage detection unit 50 measures the applied voltage and the measured value of the applied voltage is input to the control unit 60, so that operation is performed in the general monitoring mode.

The general monitoring mode is mode of measuring the applied voltage without the charging and/or discharging operations of the capacitor 22 of the storage unit 20, and comparing the measured applied voltage with the reference voltage set in the control unit 60. That is, when the voltage detection unit 50 measures applied voltage and outputs the measured value to the control unit 60, the control unit 60 compares the measured applied voltage with the reference voltage, determines whether to change into charging mode or power supply mode, and performs control such that the first and second transistor 32 or 33 of the bidirectional DC/DC converter 30 is turned on or turned off based on the determination, so that operation is performed in the charging mode or the power supply mode.

That is, it is assumed that the regenerative power storage reference voltage is 1000V and the regenerative power supply reference voltage is 500V, which are set in the control unit 60. If applied voltage is equal to or larger than the regenerative power storage reference voltage, that is, 1000V, and the storage unit 20 has not been completely charged, the mode of the bidirectional DC/DC converter 30 is changed into the charging mode, so that the bidirectional DC/DC converter 30 operates as the buck converter. If the applied voltage drops down to a value equal to or lower than the regenerative power supply reference voltage, that is, 500V, but the voltage of the both ends of the capacitor 22 of the storage unit 20 is not equal to or lower than the reference value, the mode of the bidirectional DC/DC converter 30 is changed into the power supply mode, so that the bidirectional DC/DC converter 30 operates as a boost converter. In this case, the regenerative power storage reference voltage and the regenerative power supply reference voltage can be selected depending on the peripheral devices of the electric railway car and the status of the system.

Here, when the mode of the bidirectional DC/DC converter 30 is changed into the charging mode, switching is performed on the bidirectional DC/DC converter 30 such that the first transistor 32 is turned on and the second transistor 33 which is turned off, with the result that the bidirectional DC/DC converter 30 operates as the buck converter, so that applied voltage is converted into voltage included in the rated voltage of the capacitor 22 of the storage unit 20 and the resulting voltage is stored in the capacitor 22.

Meanwhile, if the capacitor monitoring unit 90 determines that the capacitor 22 is completely charged, the control unit 60 outputs a control signal used to turn off the first transistor 32, terminates the charging mode, and changes the mode into the general monitoring mode.

Further, when the mode is changed into the power supply mode, the bidirectional DC/DC converter 30 operates as the boost converter, so that power stored in the capacitor 22 is converted into the appropriate voltage and restored.

Here, if the voltage of the capacitor 22 drops and becomes a value equal to or lower than a predetermined value, the control unit 60 outputs a control signal used to turn off the first transistor 32 and/or the second transistor 33, thereby terminating the power supply mode and changing mode into general monitoring mode.

Meanwhile, FIGS. 3 to 5 are views illustrating the various installation configurations of the regenerative power storage system mounted on a DC electric railway car according to the present invention.

That is, as shown in FIG. 3, the regenerative power storage system 1 mounted on a DC electric railway car according to the present invention may include a bidirectional DC/DC converter 30 between a main filtering unit 7 and a filter capacitor 8 for stabilizing DC voltage, thereby storing regenerative power in the storage unit 20 when the regenerative power is generated or supplying the stored regenerative power to the inverter 4.

Further, as shown in FIG. 4, the regenerative power storage system 1 mounted on DC electric railway car according to the present invention may be provided between main filtering units 7 and 9, so that, when the voltage of power supplied through the wiring 3 is equal to or larger than charging voltage, the voltage may be supplied to the inverter 4.

Further, as shown in FIG. 5, the regenerative power storage system 1 mounted on a DC electric railway car according to the present invention is provided between the inverter 4 and the motor. In this case, AC power generated in the case of regenerative braking may be converted into DC power by an AC/DC converter 31, stored in the storage unit 20 of the regenerative power storage system 1 mounted on a DC electric railway car, and then supplied when the motor 5 operates for traction if necessary.

Although the preferred embodiments of the present invention have been described above, the scope of the right of the present invention is not limited thereto and falls in the substantial equivalents of the present invention. Various modifications can be made by those skilled in the art without departing from the scope of the spirit of the present invention.

Industrial Applicability

The present invention relates generally to a regenerative power storage system mounted on a DC electric railway car, and, more particularly, to a regenerative power storage system mounted on a DC electric railway car, which is mounted on an electric railway car, directly receives and stores regenerative power generated when regenerative braking is applied in order to brake the electric railway car, and directly supplies the regenerative power to the inverter of the electric railway car again if necessary.

What is claim is:

1. A regenerative power storage system for a Direct Current (DC) electric railway car, the regenerative power storage system comprising:

an inverter converting a DC power supplied through a pantograph into an AC power in order to drive at least one motor;

a first filter unit connected between the pantograph and the inverter in series with the inverter and removing high frequency components of the DC power, the first filter unit including an first inductor and a first capacitor;

a charging unit connected between the first filter unit and the inverter in parallel with the inverter, and preventing an over current from passing therethrough;

a second filter unit connected to the charging unit in series, and configured to remove high frequency components of the DC power supplied through the charging unit, the second filter unit including a second inductor and a second capacitor;

a storage unit connected to the second filter unit and configured to store the DC power which passed through the second filter unit;

a bidirectional DC/DC converter electrically connected between the second filter unit and the storage unit in series, and controlled such that the bidirectional DC/DC converter is open or closed in charging mode or electricity mode in response to a control signal;

a DC/DC filter electrically connected between the bidirectional DC/DC converter and the storage unit in series, and configured to remove high frequency noise;

a voltage detection unit configured to detect applied voltage of the second filter unit; and a control unit configured to determine the applied voltage detected by the voltage detection unit, and configured to perform control such that the bidirectional DC/DC converter is open or closed.

2. The regenerative power storage system as set forth in claim 1, further comprising a current detection unit detecting an amount of current which flows into the second filter unit, and outputting the detected amount of current to the control unit, wherein the charging unit further comprises a cut-off switch for opening or closing electrical connection between the pantograph and the charging unit; and wherein the control unit opens the cut-off switch when over current is detected by the current detection unit.

3. The regenerative power storage system as set forth in claim 1, wherein the charging unit comprises:

an impedance performing impedance matching on circuits;

a cut-off switch configured to cut off the DC power which flows into the charging unit; and a charging switch connected in series and turning on or off charging of the second capacitor of the second filter unit.

4. The regenerative power storage system as set forth in claim 1, wherein the storage unit comprises a third capacitor, and the regenerative power storage system further comprising a capacitor monitoring unit for measuring charging voltage of the third capacitor of the storage unit, and outputting the measured charging voltage to the control unit, so that the control unit turns off a first transistor when the storage unit is completely charged during operation in charging mode, and turns off a second transistor when the charging voltage is equal to or lower than a reference voltage during operation in power supply mode.

5. The regenerative power storage system as set forth in claim 4, wherein the first transistor and the second transistor are Insulated Gate Bipolar Transistors (IGBTs).

6. The regenerative power storage system as set forth in claim 1, wherein the DC/DC filter comprises an inductor for removing high frequency noise.

7. The regenerative power storage system as set forth in claim 1, wherein the storage unit comprises a super capacitor.

8. The regenerative power storage system as set forth in claim 4, wherein the storage unit further comprises a discharging switch connected to the third capacitor in parallel for discharging charged power of the capacitor.

* * * * *